US012185218B2

(12) United States Patent
Saini et al.

(10) Patent No.: US 12,185,218 B2
(45) Date of Patent: *Dec. 31, 2024

(54) DYNAMIC ALLOCATION OF BROADCAST STREAM SUPPORT

(71) Applicant: Cisco Technology, Inc., San Jose, CA (US)

(72) Inventors: Vinay Saini, Bengaluru (IN); Jerome Henry, Pittsboro, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 17/562,715

(22) Filed: Dec. 27, 2021

(65) Prior Publication Data

US 2022/0124599 A1 Apr. 21, 2022

Related U.S. Application Data

(63) Continuation-in-part of application No. 17/018,216, filed on Sep. 11, 2020, now Pat. No. 11,240,638.

(51) Int. Cl.
*H04W 4/02* (2018.01)
*H04H 20/72* (2008.01)
*H04W 8/00* (2009.01)
*H04W 40/24* (2009.01)
*H04W 72/30* (2023.01)

(52) U.S. Cl.
CPC .......... *H04W 40/246* (2013.01); *H04H 20/72* (2013.01); *H04W 8/005* (2013.01); *H04W 72/30* (2023.01)

(58) Field of Classification Search
CPC . H04W 24/10; H04W 72/23; H04W 36/0058; H04W 48/16; H04W 36/00835; H04W 48/20; H04W 88/02; H04W 36/00837; H04W 36/302; H04W 72/0446; H04W 72/21; H04W 84/045; H04W 88/06; H04W 36/04; H04W 72/0453; H04W 76/14; H04W 84/12; H04W 24/02; H04W 24/08; H04W 36/0085; H04W 60/00; H04W 36/08; H04L 5/0048; H04L 5/0053; H04L 5/0057; H04L 5/005; H04L 5/0023;

(Continued)

(56) References Cited

U.S. PATENT DOCUMENTS

| 11,240,638 B1 * | 2/2022 | Saini ................. H04W 4/06 |
| 2017/0237544 A1 * | 8/2017 | Wang ................. H04L 5/22 370/280 |
| 2017/0238280 A1 * | 8/2017 | Kim ................... H04W 72/30 370/329 |

FOREIGN PATENT DOCUMENTS

WO WO-2018003025 A1 * 1/2018

* cited by examiner

*Primary Examiner* — Quan M Hua
(74) *Attorney, Agent, or Firm* — Patterson + Sheridan, LLP

(57) ABSTRACT

Aspects described herein include a method and related network device and computer program product. The method includes receiving a neighbor report that indicates whether a first network device in an environment is advertising broadcast services and generating, using the neighbor report, a broadcast optimization map that indicates a set of network devices in the environment that will provide a broadest coverage of broadcast services within the environment. The set corresponds to a minimum count of network devices that supports all current broadcast streams by one or more client devices in the environment.

20 Claims, 6 Drawing Sheets

(58) Field of Classification Search
CPC .. H04B 17/309; H04B 17/336; H04B 7/0695; H04B 7/0626; H04B 7/024; H04B 7/0617
See application file for complete search history.

DYNAMIC ALLOCATION OF BROADCAST STREAM SUPPORT

CROSS-REFERENCE TO RELATED APPLICATIONS

This application is a continuation-in-part of co-pending U.S. patent application Ser. No. 17/018,216 filed Sep. 11, 2020. The aforementioned related patent application is herein incorporated by reference in its entirety.

TECHNICAL FIELD

Embodiments presented in this disclosure generally relate to wireless networking, and more specifically, to techniques for dynamically allocating wireless networking resources for broadcast streams.

BACKGROUND

Wireless networking is increasingly used for broadcast streams, such as for streaming high-definition (HD) video content. However, using certain wireless networking protocols such as Wi-Fi, all client devices may be required to share a common channel with the access point (AP). This configuration may lead to congestion and starvation of airtime for other critical traffic. For Wi-Fi 6 (802.11ax) environments, the downstream broadcast traffic consumes bandwidth and spatial streams while being of interest for only a subset of users. Further, transmission rates of broadcast streams may be limited to relatively low rates, such as basic rates.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
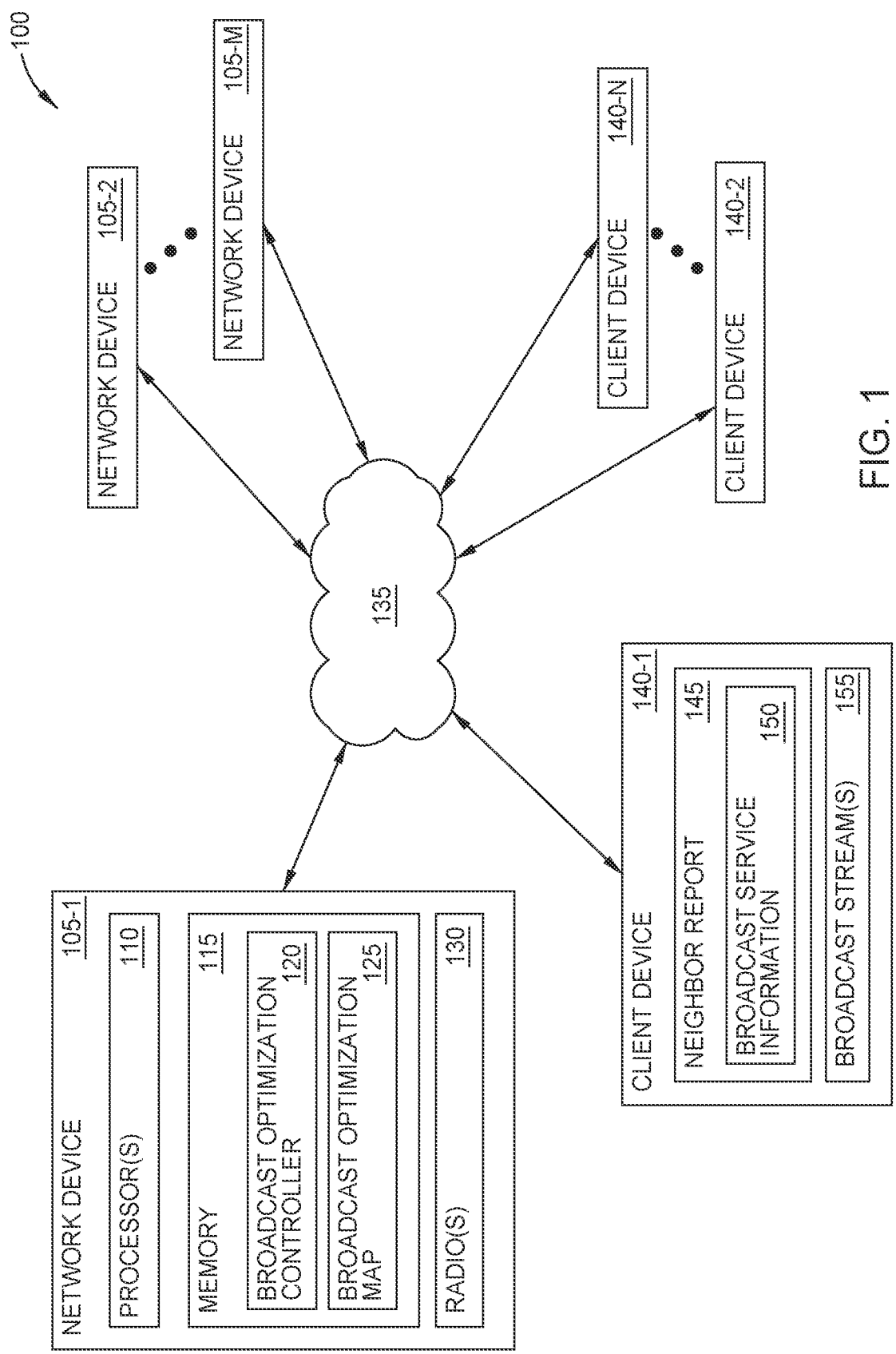
FIG. 1 is a diagram illustrating an exemplary system of network devices and client devices, according to one or more embodiments.

One embodiment presented in this disclosure is a method for use in an environment comprising a plurality of network devices capable of providing broadcast services to one or more client devices. The method comprises receiving, from a client device, a neighbor report that indicates whether one or more network devices of the plurality of network devices are advertising broadcast services. The method further comprises generating, using the neighbor report, a broadcast optimization map that indicates a set of one or more of the plurality of network devices that will provide a broadest coverage of broadcast services within the environment. The set corresponds to a minimum count of network devices that supports all current broadcast streams by the one or more client devices.

Another embodiment presented in this disclosure is a network device for use in an environment comprising a plurality of network devices capable of providing broadcast services to one or more client devices. The network device comprises a broadcast optimization controller implemented using one or more computer processors. The broadcast optimization controller is configured to receive, from a client device, a neighbor report that indicates whether one or more network devices of the plurality of network devices are advertising broadcast services. The broadcast optimization controller is further configured to generate, using the neighbor report, a broadcast optimization map that indicates a set of one or more of the plurality of network devices that will provide a broadest coverage of broadcast services within the environment. The set corresponds to a minimum count of network devices that supports all current broadcast streams by the one or more client devices.

Another embodiment presented in this disclosure is a computer program product comprising a computer-readable storage medium having computer-readable program code embodied therewith, the computer-readable program code executable by one or more computer processors to perform an operation within in an environment comprising a plurality of network devices capable of providing broadcast services to one or more client devices. The operation comprises receiving, from a client device, a neighbor report that indicates whether one or more network devices of a plurality of network devices are advertising broadcast services. The operation further comprises generating, using the neighbor report, a broadcast optimization map that indicates a set of one or more of the plurality of network devices that will provide a broadest coverage of broadcast services within the environment. The set corresponds to a minimum count of network devices that supports all current broadcast streams by the one or more client devices.

Example Embodiments

Wi-Fi has become a primary wireless access technology for office and home uses and may often be used for broadcast streaming by multiple devices at the same time. Broadcast streams are generally not favored in Wi-Fi and are transmitted at low basic rates. Some examples of broadcast streams include streaming HD video content to multiple client devices, broadcasting video market updates to broker devices on a trading floor, broadcasting public address announcements at a school or airport, and transmitting real-time status updates between control systems and machines in an industrial environment.

Although multiple receivers may be receiving a particular broadcast stream, other users in the same cells may experience degraded performance for other critical applications. The degradation may be exacerbated in cases where there are multiple streams being broadcast simultaneously. One example of this is broadcasting multiple television streams at an airport or hotel. The multiple streams may require different amounts of resources based on the codec used by the broadcaster.

According to embodiments described herein, a method is described for use in an environment comprising a plurality of network devices capable of providing broadcast services to one or more client devices. The method comprises receiving, from a client device, a neighbor report that indicates whether one or more network devices of the plurality of network devices are advertising broadcast services. The method further comprises generating, using the neighbor report, a broadcast optimization map that indicates a set of one or more of the plurality of network devices that will provide a broadest coverage of broadcast services within the environment. The set corresponds to a minimum count of network devices that supports all current broadcast streams by the one or more client devices.

In some embodiments, the method is performed by a broadcast optimization controller of a network device. In some embodiments, generating the broadcast optimization map comprises updating a broadcast coverage map with any of the one or more network devices that are advertising broadcast services, updating a prospective coverage map with any of one or more network devices of the plurality of network devices that are not advertising broadcast services, and comparing the broadcast coverage map with the prospective coverage map.

In some embodiments, the neighbor report comprises a respective first flag for each network device that indicates whether the network device is advertising broadcast services, and/or a second flag that indicates whether any broadcast streams were detected by the client device.

Beneficially, the broadcast optimization controller provides an intelligent mechanism that dynamically allocates airtime resources for broadcasted services, which can provide an improved user experience while reducing an impact on other critical data services. The broadcast optimization controller may provide an optimization based on the physical layout of the environment, as well as the current broadcast flows.

FIG. 1 is a diagram illustrating an exemplary system 100 of a plurality of network devices 105-1, 105-2, ..., 105-M (generically or collectively, network device(s) 105) and one or more client devices 140-1, 140-2, ..., 140-N (generically or collectively, client device(s) 140), according to one or more embodiments. In the system 100, the network devices 105 and the client devices 140 are communicatively coupled through a network 135. The network 135 represents one or more networks of any suitable types, such as the Internet, a local area network (LAN), a wide area network (WAN), and/or a wireless network. Further, the network 135 may comprise copper transmission cables, optical transmission fibers, wireless transmission, routers, firewalls, switches, gateway computers and/or edge servers.

The network device 105-1 comprises one or more computer processors 110 (also referred to as processors 110), a memory 115, and one or more radios 130. The network device 105-1 may be implemented in any suitable form to provide broadcast services to the one or more client devices 140, such as an access point (AP). The other network devices 105-2, ..., 105-M may be similarly configured to the network device 105-1 to provide broadcast services, although they need not have an implementation identical to the network device 105-1.

The one or more computer processors 110 may be implemented in any suitable form, such as a general purpose microprocessor, a controller, an application-specific integrated circuit (ASIC), and so forth. The memory 115 may include a variety of computer-readable media selected for their size, relative performance, or other capabilities: volatile and/or non-volatile media, removable and/or non-removable media, etc.

The memory 115 may include one or more modules for performing various functions described herein. In one embodiment, each module includes program code that is executable by the one or more computer processors 110. In another embodiment, each module is partially or fully implemented in hardware (i.e., circuitry) or firmware of the network device 105-1 (e.g., as circuitry within the one or more processors 110). However, other embodiments of the system 100 may include modules that are partially or fully implemented in other hardware or firmware, such as hardware or firmware included in one or more other network devices 105-2, ..., 105-M, one or more of the client devices 140-1, ..., 140-N, and so forth. Stated another way, the overall functionality of the one or more modules may be distributed among other devices of the system 100.

As shown, the memory 115 comprises a module implementing a broadcast optimization controller 120 that dynamically allocates broadcast stream support to the client devices 140-1, ..., 140-N. The broadcast optimization controller 120 may perform the dynamic allocation based on the physical layout of the environment (e.g., the composition of the client devices 140, the capabilities of the network devices 105 and the client devices 140, the relative positioning of the network devices 105 and the client devices 140), as well as the broadcast flows requested by or currently streamed to the client devices 140.

In some embodiments, the broadcast optimization controller 120 generates a broadcast optimization map 125 that indicates a set of one or more of the plurality of network devices 105 that will provide a broadest coverage of broadcast services within the environment. In some embodiments, the set corresponds to a minimum count of network devices 105 that supports all current broadcast streams by the one or more client devices 140. Other optimization rules that consider both the physical layout of the environment and the requested or streamed broadcast flows are also contemplated for the broadcast optimization controller 120. The broadcast optimization map 125 may be stored in the memory 115 and updated by the broadcast optimization controller 120. An exemplary sequence of generating and updating a broadcast optimization map 125 is described below with respect to FIGS. 3-6.

The network device 105-1 is communicatively coupled to the network 135 using the one or more radios 130. The one or more radios 130 may include single-band and/or multiple-band radios, such that in some cases, the network device 105-1 provides wireless network access for a plurality of bands (e.g., 2.4 gigahertz (GHz), 5 GHz, 6 GHz, and so forth) using the one or more radios 130. The other network devices 105-2, ..., 105-M may be similarly configured to provide access for one or more bands.

The one or more client devices 140 may include any suitable computing devices capable of wirelessly requesting and/or receiving broadcast streams 155. For example, the one or more client devices 140 may include desktop computing devices, mobile computing devices (e.g., smartphones, tablets), wearable computing devices, and other electronic devices (e.g., printers, smart televisions, smart appliances). Each client device 140 may include one or more computer processors, a memory, and one or more radios.

The client device 140-1 generates a neighbor report 145 that indicates neighboring radios that are detected by the client device 140-1 (e.g., radio(s) of the network devices 105), the signal strength of the radios, and so forth. In some embodiments, the neighbor report 145 comprises an IEEE 802.11k neighbor report. Generating the neighbor report 145 may occur when the client device 140-1 associates with a network device 105, whether unprompted or responsive to a query from the network device 105.

In some embodiments, the neighbor report 145 includes broadcast service information 150 indicating whether the detected network devices 105 are advertising broadcast services and/or current transmitting broadcast streams. The broadcast service information 150 may be implemented in any suitable form. In some embodiments, the neighbor report 145 comprises a respective first flag for each network device 105 that indicates whether the network device 105 is advertising broadcast services, and/or a second flag that indicates whether any broadcast streams were detected by the client device 140.

The broadcast optimization controller 120 may generate the broadcast optimization map 125 using the neighbor report 145 received from the client device 140. In some embodiments, the broadcast optimization controller 120 maintains a broadcast coverage map indicating a collective broadcast coverage that is currently provided by the network devices 105. Using the neighbor report 145, the broadcast optimization controller 120 updates the broadcast coverage map with any of the one or more network devices 105 that are advertising broadcast services.

In some embodiments, the broadcast optimization controller 120 maintains a prospective coverage map that includes a collective broadcast coverage that may be potentially provided by the network devices 105 (e.g., responsive to changing one or more operational parameters). In some embodiments, the prospective coverage map reflects the effects of enabling broadcast services and/or providing broadcast services using different bands. Using the neighbor report 145, the broadcast optimization controller 120 updates the prospective coverage map with any of one or more network devices 105 that are not advertising broadcast services. In some embodiments, updating the prospective coverage map with any of one or more network devices 105 that are not advertising broadcast services comprises identifying a network device 105 that is not advertising broadcast services and that has a signal strength greater than a threshold value. For example, the prospective coverage map may be updated for a network device 105 having an RSSI value greater than that of another network device 105 that currently advertises broadcast services, which suggests the possibility that the network device 105 that is not advertising broadcast services may provide greater broadcast coverage when broadcast services are enabled.

In some embodiments, the broadcast optimization controller 120 compares the broadcast coverage map with the prospective coverage map. In this way, the broadcast optimization controller 120 may identify covered areas in the environment, potentially covered areas, whether any gaps exist in broadcast coverage (e.g., areas that are neither covered nor potentially covered).

As mentioned above, the broadcast optimization map 125 indicates a set of one or more network devices 105 that will provide a broadest coverage of broadcast services for a minimum count of network devices 105 capable of supporting the broadcast streams 155 by the one or more client devices 140. The broadcast optimization controller 120 specifies optimal radio(s) 130 of the network devices 105 and/or optimal channels in the broadcast optimization map 125. The broadcast optimization controller 120 (or the network devices 105-1) may communicate with the other network devices 105-2, . . . , 105-M to disable broadcast services on other radios to thereby improve their performance by removing the unused broadcast flows.

The broadcast optimization controller 120 may dynamically update the broadcast optimization map 125 responsive to additional broadcast demand (e.g., new requests for broadcast streams). In some embodiments, the broadcast optimization controller 120 determines an optimal band or channel based on a channel capability, a count of the client devices 140, and/or a count of the broadcast flows.

In one non-limiting example, the broadcast optimization map 125 assigns a large cell (e.g., 2.4 GHz band) of a network device 105 to provide large coverage support for broadcast streams, while smaller cells on the same network device (e.g., 5 GHz and/or 6 GHz bands) may be reserved for non-broadcast, more efficient traffic. The network device 105 may provide this assignment information to Radio Resource Management (RRM) for transmit power control (TPC) optimization.

In some embodiments, the broadcast optimization map 125 assigns different bands (e.g., 2.4 GHz band, 5 GHz band, and 6 GHz band) hierarchically to provide coverage support for broadcast streams. For example, the broadcast optimization map 125 may assign different network devices 105 to provide large broadcast coverage support using the 2.4 GHz band. For any detected gaps in the broadcast coverage, the broadcast optimization map 125 then assigns different network devices 105 to fill in those gaps using the 5 GHz band. The same may then be done to use the 6 GHz band to fill in gaps left by the 2.4 GHz band and the 5 GHz band. In this manner, the broadcast optimization map 125 provides large broadcast coverage while minimizing the disruption to other traffic, in certain embodiments. The broadcast optimization map 125 may assign different network devices 105 to broadcast first on the 2.4G Hz band and maximize their power optimization to provide large coverage of the areas where broadcast clients are detected. The 5 GHz and 6 GHz bands would only then be added as contributors in the gaps in coverage area left by the 2.4 GHz band.

Figure 2:
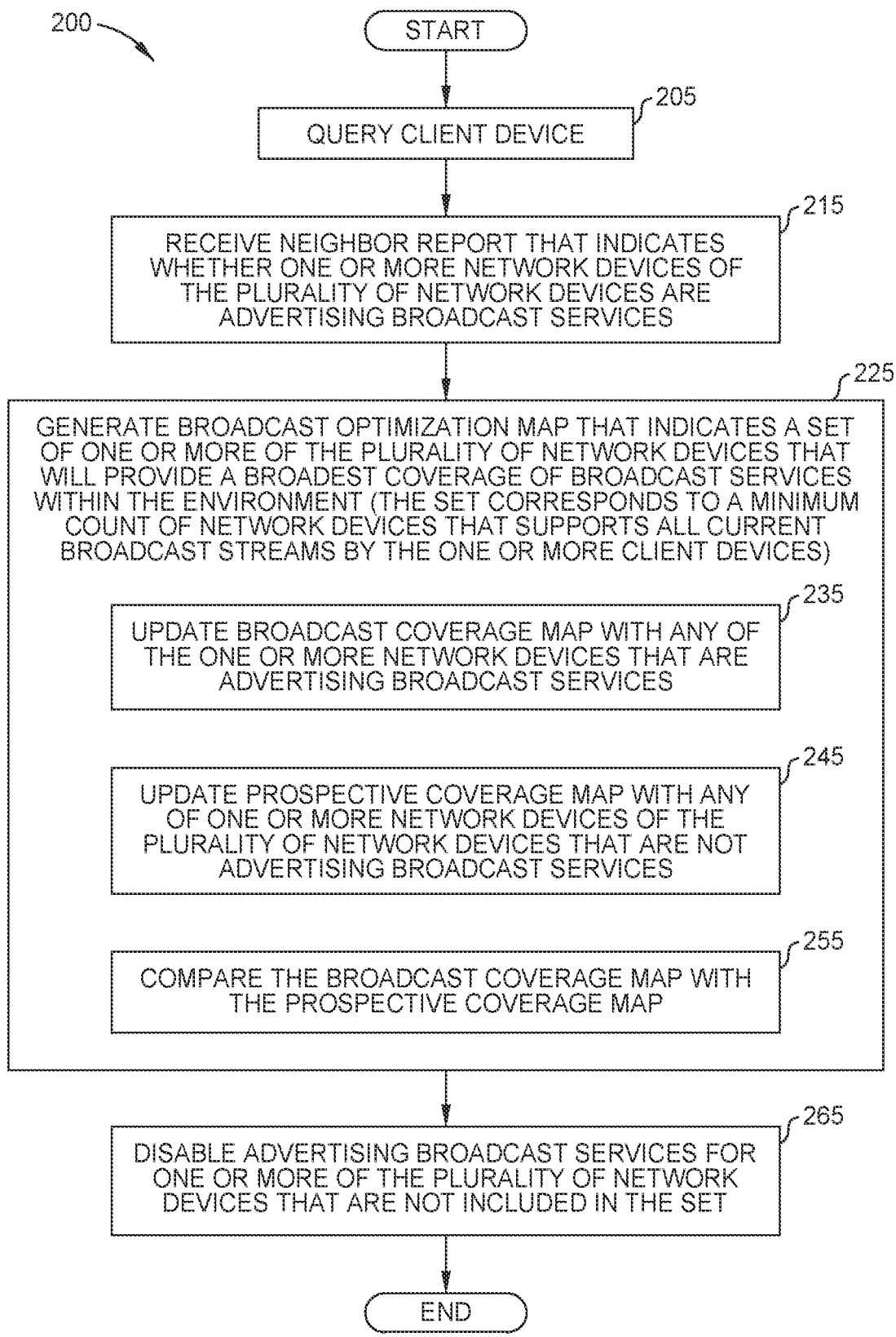
FIG. 2 is an exemplary method for use in an environment having network devices capable of providing broadcast services to client devices, according to one or more embodiments.

This process differs from conventional RRM, because RRM attempts to make a blanket coverage for each band (one for 2.4, one for 5, one for 6 GHz), with the goal that the network device 105 should be heard with a particular signal strength by its closest neighbors on each band. By contrast, here, the 2.4 GHz band would create a blanket without the goal that the network device 105 should be heard with a particular signal strength by its closes neighbors, but rather with the goal 'ignore the overlap and minimize the gaps at floor level.' Then, a secondary band (e.g. 5 GHz) is called upon if the objective is not reached with 2.4 GHz band alone. The 6 GHz band is called if the 5 GHz band is not enough to fill the gaps. This approach can coexist with the conventional one, but stretch the regular RRM boundaries to achieve the regular RRM goals and this broadcast specific coverage optimization map FIG. 2 is an exemplary method 200 for use in an environment having network devices capable of providing broadcast services to client devices, according to one or more embodiments. The method 200 may be used in conjunction with other embodiments, for example, performed by the broadcast optimization controller 120 of FIG. 1.

The method 200 begins at block 205, where a client device is queried by a network device to provide a neighbor report. In some embodiments, querying the client device is performed as part of a floor discovery operation by the network device. For example, querying the client device may be responsive to a client device requesting a broadcast stream or requesting information about a broadcast stream (e.g., a DNS resolution for a broadcast source, known in the wireless LAN controller through Application Visibility and Control (AVC), or a HTTPS request). In some embodiments, the query specifies one or more channels of known neighboring network devices. In some embodiments, the query specifies one or more bands dedicated to broadcast streams.

At block 215, a neighbor report is received from the client device that indicates whether one or more network devices of the plurality of network devices are advertising broadcast services. In some embodiments, the neighbor report comprises a respective first flag for each network device that indicates whether the network device is advertising broadcast services, and/or a second flag that indicates whether any broadcast streams were detected by the client device.

At block 225, a broadcast optimization map is generated that indicates a set of one or more of the plurality of network devices that will provide a broadest coverage of broadcast services within the environment. In some embodiments, the set corresponds to a minimum count of network devices that supports all current broadcast streams by the one or more client devices.

In some embodiments, generating the broadcast optimization map comprises, at block 235, updating a broadcast coverage map with any of the one or more network devices that are advertising broadcast service. In some embodiments, the broadcast optimization controller maintains individual coverage maps for each of the detected network devices, which may include coverage in different bands. The broadcast optimization controller may combine the individual coverage maps to update the broadcast coverage map.

At block 245, a prospective coverage map is updated with any of one or more network devices of the plurality of network devices that are not advertising broadcast services. In some embodiments, updating the prospective coverage map comprises identifying a network device that is not advertising broadcast services and that has a signal strength greater than a threshold value. For example, the prospective coverage map may be updated for a network device having an RSSI value greater than that of another network device that currently advertises broadcast services. At block 255, the broadcast coverage map is compared with the prospective coverage map.

At block 265, advertising broadcast services is disabled for one or more of the plurality of network devices that are not included in the set. Disabling the advertising permits radio(s) and/or network devices to be dedicated to more efficient, non-broadcast traffic, which may improve the performance of the network devices. The method 200 ends following completion of block 265. Notably, the method 200 or portions thereof may be repeated periodically or sporadically (e.g., responsive to a change in composition of the client devices or in the network devices, responsive to a requested or completed broadcast stream, and so forth).

Figure 3:
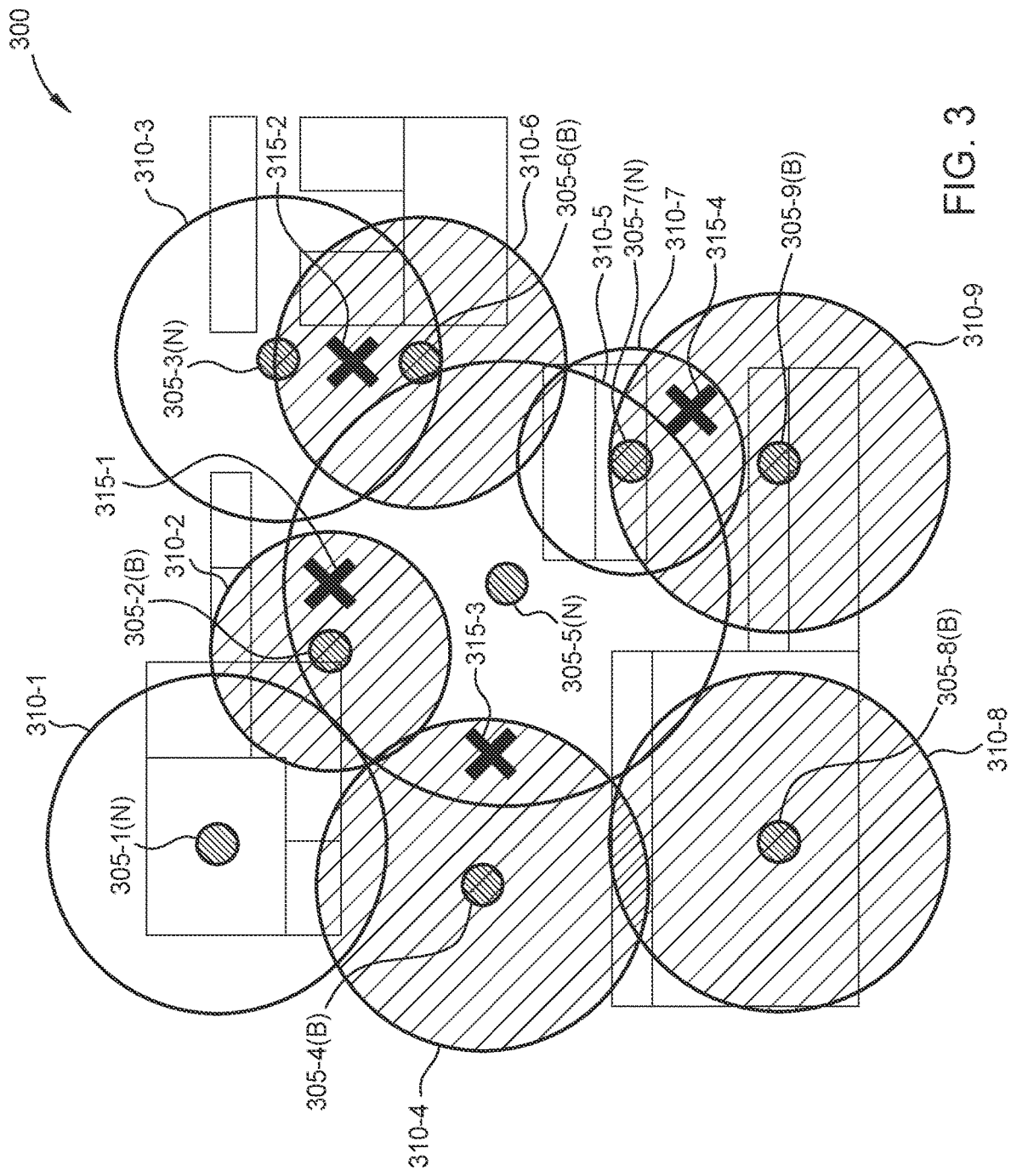
FIG. 3 is a diagram illustrating an exemplary broadcast coverage map, according to one or more embodiments.

FIG. 3 is a diagram 300 illustrating an exemplary broadcast coverage map, according to one or more embodiments. The features illustrated in the diagram 300 may be used in conjunction with other embodiments, for example, representing a broadcast coverage map generated by the broadcast optimization controller 120 of FIG. 1.

A plurality of network devices 305-1, 305-2, . . . , 305-9 (generically or collectively, network device(s) 305) are depicted within a representative environment (e.g., an office layout). The network devices 305 represent examples of the network devices 105 of FIG. 1. For example, the network devices 305 may be implemented as APs, and one or more of the network devices 305 may comprise a broadcast optimization controller 120.

Each network device 305-1, 305-2, . . . , 305-9 has a respective coverage 310-1, 310-2, . . . , 310-9 (generically or collectively, coverage(s) 310). Although the coverages 310-1, 310-2, . . . , 310-9 represent the coverage provided by a single radio of the network device 305-1, 305-2, . . . , 305-9, each network device 305 may have different radios providing different broadcast coverages.

In the configuration shown in diagram 300, the network devices 305-2, 305-4, 305-6, 305-8, 305-9 are currently advertising broadcast services (indicated by the hatching of the circles representing the coverages 310-2, 310-4, 310-6, 310-8, 310-9 and the reference character (B)). The network devices 305-1, 305-3, 305-5, 305-7 are not advertising broadcast services (indicated by the lack of hatching of the circles representing the coverages 310-1, 310-3, 310-5, 310-7 and the reference character (N)). Thus the broadcast coverage of the network is represented by the union of the coverages 310-2, 310-4, 310-6, 310-8, 310-9.

A plurality of client devices 315-1, 315-2, 315-3, 315-4 (generically or collectively, client device(s) 315) are depicted within the representative environment of the diagram 300. The client devices 315 represent examples of the client devices 140 of FIG. 1, and each client device 315 may be considered to have a current broadcast stream. The client device 315-1 is overlapped by the coverages 310-2, 310-5, the client device 315-2 is overlapped by the coverages 310-3, 310-6, the client device 315-3 is overlapped by the coverages 310-4, 310-5, and the client device 315-4 is overlapped by the coverages 310-7, 310-9. Thus, either of the network devices 305-2, 305-5 may be capable of providing broadcast services to the client device 315-1, either of the network devices 305-3, 305-6 may be capable of providing broadcast services to the client device 315-2, and so forth.

Figure 4:
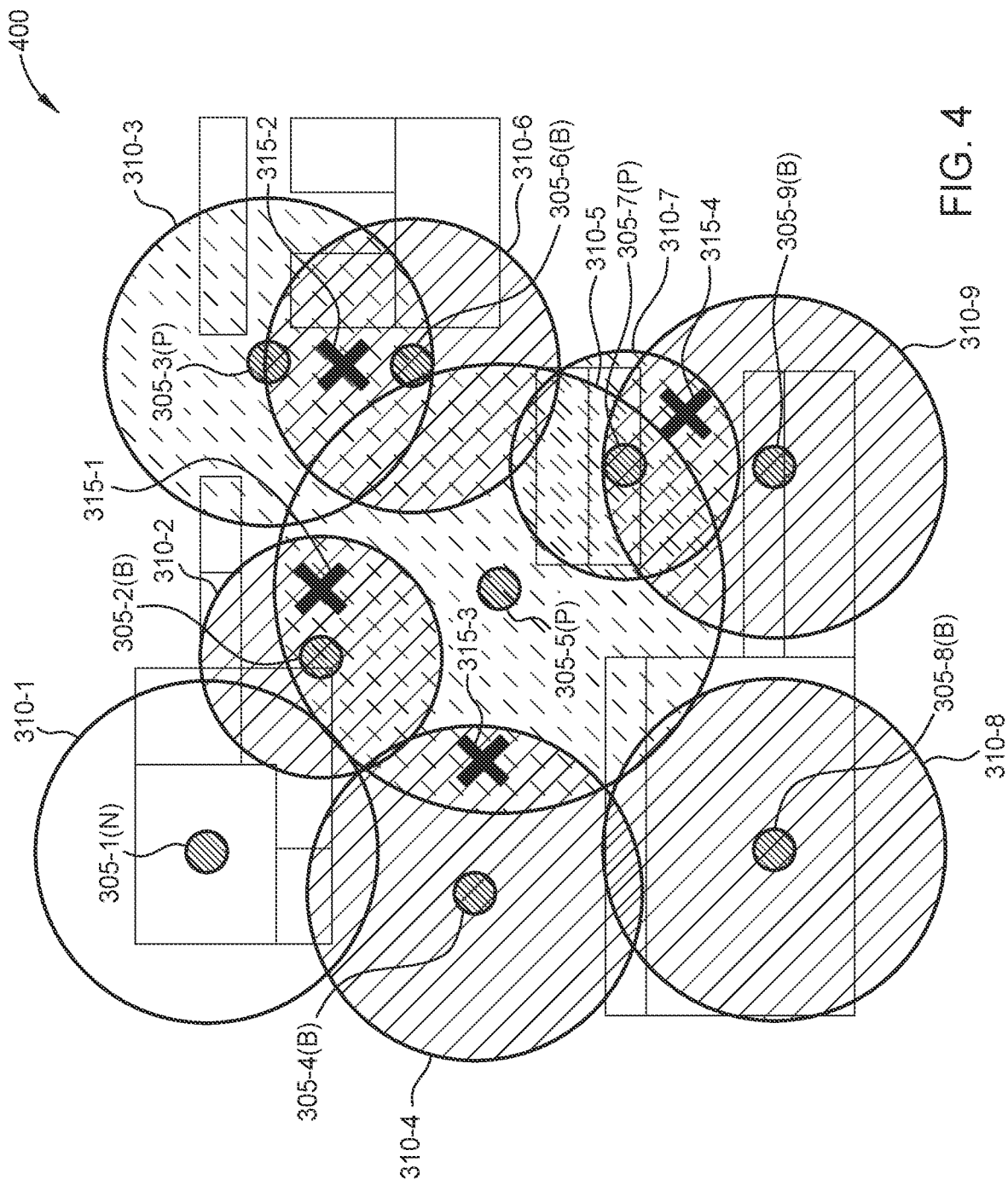
FIG. 4 is a diagram illustrating an exemplary prospective coverage map, according to one or more embodiments.

FIG. 4 is a diagram 400 illustrating an exemplary prospective coverage map, according to one or more embodiments. The features illustrated in the diagram 400 may be used in conjunction with other embodiments, for example, representing a prospective coverage map generated by the broadcast optimization controller 120 of FIG. 1 and referenced to the diagram 300 of FIG. 3.

In the prospective coverage map, the broadcast optimization controller 120 identifies the network devices 305-3, 305-5, 305-7 as being suitable to provide broadcast services to the client devices 315 in the current configuration (indicated by the patterning of the circles representing the coverages 310-3, 310-5, 310-7 and the reference character (P)). Stated another way, the coverages 310-3, 310-5, 310-7 which are determined to overlap one or more client devices 315 are included in the prospective coverage map as possibilities to provide broadcast services to the one or more client devices 315. Thus, the prospective broadcast coverage of the network is represented by the union of the coverages 310-2, 310-3, 310-4, 310-5, 310-6, 310-7, 310-8, 310-9.

Figure 5:
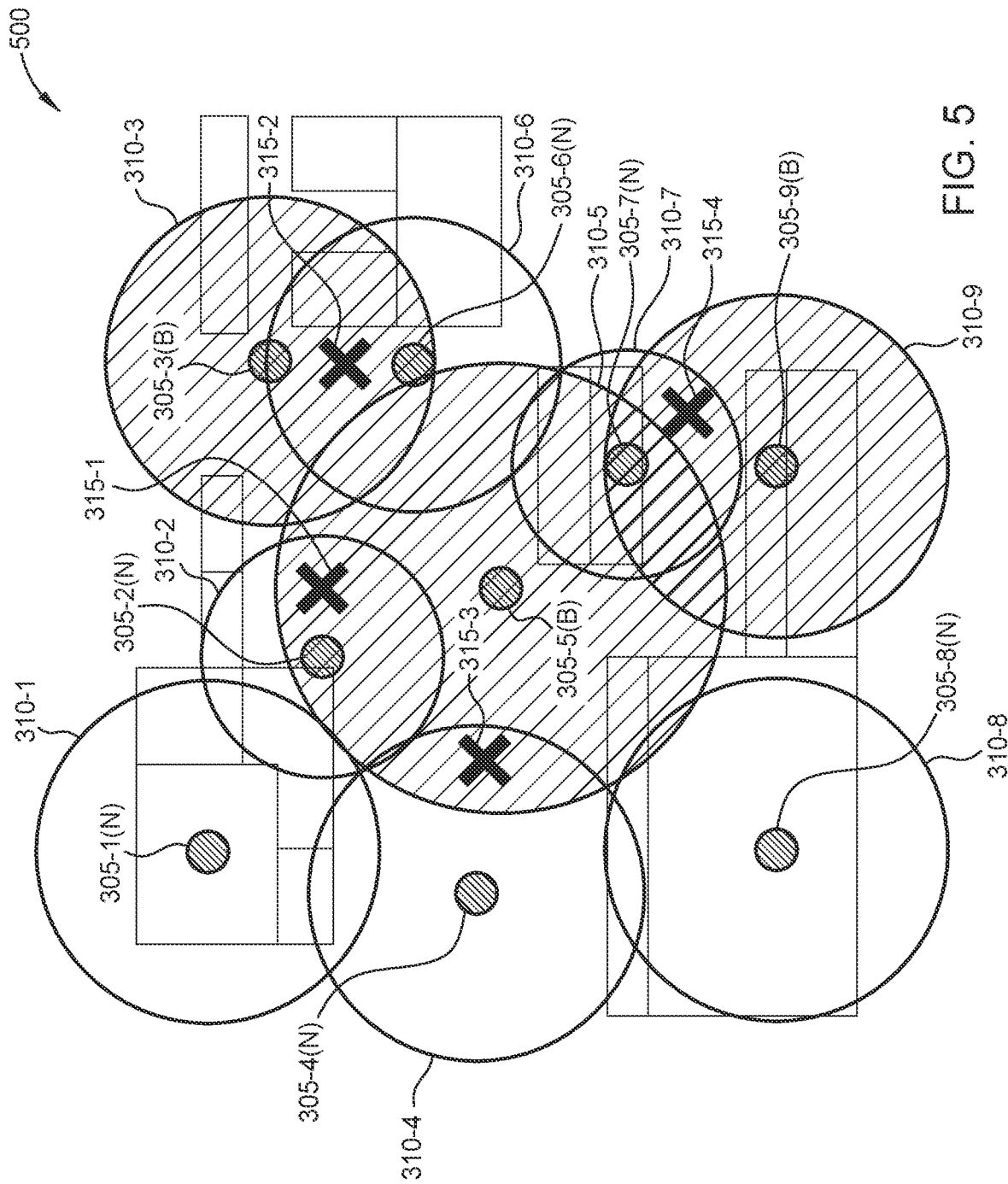
FIG. 5 is a diagram illustrating an exemplary broadcast optimization map, according to one or more embodiments.

FIG. 5 is a diagram 500 illustrating an exemplary broadcast optimization map, according to one or more embodiments. The features illustrated in the diagram 500 may be used in conjunction with other embodiments, for example, representing a broadcast optimization map 125 generated by the broadcast optimization controller 120 of FIG. 1 and referenced to prospective coverage map of FIG. 4.

In the broadcast optimization map, the broadcast optimization controller 120 indicates a set of one or more of the plurality of network devices 305 that will provide a broadest coverage of broadcast services within the environment, while corresponding to a minimum count of network devices 305 that supports all current broadcast streams by the one or more client devices 315.

To generate the broadcast optimization map, the broadcast optimization controller 120 may make a determination for each of the client devices 315. For example, for the client device 315-1, the broadcast optimization controller 120 may select the network device 305-2 or 305-5 that provides a greater broadcast coverage. For the client device 315-2, the broadcast optimization controller 120 may select the network device 305-3 or 305-6 that provides a greater broadcast coverage. For the client device 315-3, the broadcast optimization controller 120 may select the network device 305-4 or 305-5 that provides a greater broadcast coverage. For the client device 315-4, the broadcast optimization controller 120 may select the network device 305-7 or 305-9 that provides a greater broadcast coverage. In some cases, determining the greater broadcast coverage comprises comparing the area of the coverages 310. In some cases, determining the greater broadcast coverage comprises determining which coverage 310 contributes to a greater area collectively. As shown in the diagram 500, the broadcast optimization map specifies that the network device 305-5 should provide broadcast services to the client devices 315-1, 315-3, the network device 305-3 should provide broadcast services to the client device 315-2, and the network device 305-9 should provide broadcast services to the client device 315-4.

In some embodiments, the broadcast optimization controller 120 selects the network devices 305 to generate a minimal set, which in this case corresponds to three (3) network devices 305. For example, assume that the union of the coverages 310-2, 310-4 equals the coverage 310-5. Instead of selecting two network devices 305-2, 305-4 to provide broadcast services to the client devices 315-1, 315-3, the broadcast optimization controller 120 may select one network device 305-5 to provide broadcast services to the client devices 315-1, 315-3. In this way, the network devices 305-2, 305-4 (and/or other bands of the network device 305-5) may be reserved for more efficient network traffic (e.g., unicast traffic).

The broadcast optimization controller 120 enables and/or disables advertising broadcast services according to the broadcast optimization map. Describing the transition from the diagram 300 to the broadcast-optimized diagram 500, the broadcast optimization controller 120 enables advertising broadcast services for the network devices 305-3, 305-5 and disables advertising broadcast services for the network devices 305-2, 305-4, 305-6, 305-8.

Figure 6:
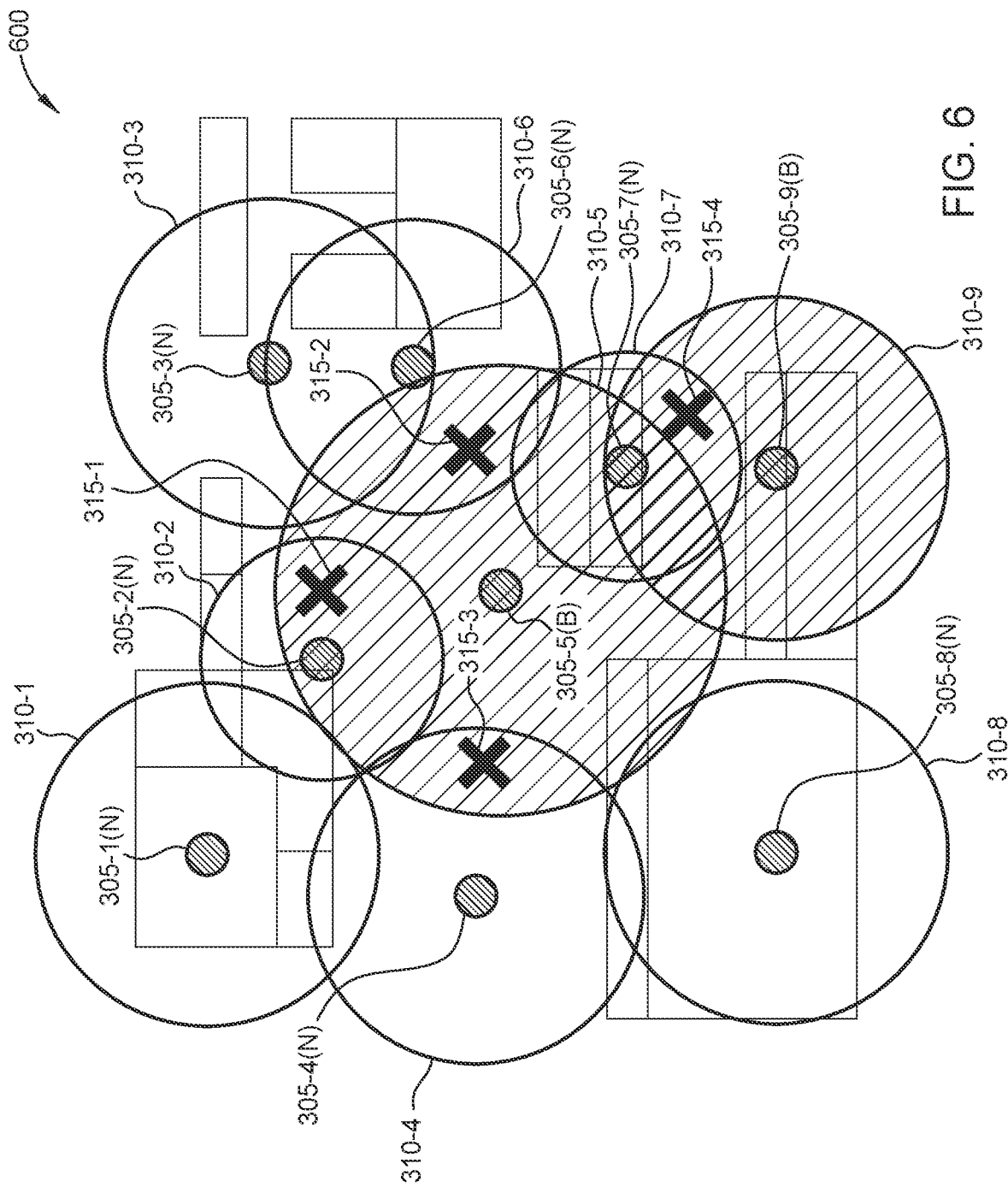
FIG. 6 is a diagram illustrating an exemplary update of a broadcast optimization map, according to one or more embodiments.

FIG. 6 is a diagram 600 illustrating an exemplary update for a broadcast optimization map, according to one or more embodiments. The features illustrated in the diagram 600 may be used in conjunction with other embodiments, for example, representing an updated broadcast optimization map generated by the broadcast optimization controller 120 of FIG. 1 and referenced to the broadcast optimization map of FIG. 5.

In the diagram 600, the client device 315-2 has moved within the environment such that the client device 315-2 is overlapped by the coverages 310-5 and 310-6, and is no longer overlapped by the coverage 310-3. The broadcast optimization controller 120 may determine, for the client device 315-2, which of the network devices 305-5, 305-6 provides a greater broadcast coverage. Although enabling the network device 305-6 may contribute to a larger overall coverage, the broadcast optimization controller 120 may select the network device 305-5 to generate a minimal set, which in this case corresponds to two (2) network devices 305. The broadcast optimization controller 120 may disable advertising broadcast services for the network device 305-3.

The broadcast optimization controller 120 may dynamically update the broadcast optimization map responsive to different conditions, such as a change in composition of the client devices or in the network devices, a requested or completed broadcast stream, and so forth. In one non-limiting example, a client device may express interest for a broadcast flow from a network device. The network device relays the query to the broadcast optimization controller 120. The broadcast optimization controller 120 identifies a "best available" radio or channel based on the location of the client device, and requests that the client device join the best available radio or channel. In some cases, the best available radio or channel may be determined based on RF conditions, channel bandwidth, client capability, Application Visibility and Control (AVC), Quality of Service (QoS), and so forth.

The broadcast optimization controller 120 may re-assess the allocation at intervals. As a number of broadcast flows increases (and in some cases, approaches a saturation threshold), the broadcast optimization controller 120 may transition some or all of the broadcast flows to a higher basic rate, and/or redistribute broadcast support roles to additional network devices. The opposite functions may be performed in cases where the number of broadcast flows decrease.

In some cases, when no broadcast clients are identified, the broadcast optimization controller 120 may enter a watch mode. In some embodiments, in the watch mode the broadcast optimization controller 120 directs a network device to operate one radio to advertise broadcast support at a maximum power level. As broadcast clients are identified, the broadcast optimization controller 120 may return to re-assessing the allocation as described above.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving a neighbor report that indicates whether a first network device in an environment is advertising broadcast services; and
generating, using the neighbor report, a broadcast optimization map that indicates a set of network devices in the environment that will provide a broadest coverage of broadcast services within the environment, wherein the set corresponds to a minimum count of network devices that supports all current broadcast streams by one or more client devices in the environment.

2. The method of claim 1, further comprising disabling advertising broadcast services for a second network device that is not included in the set.

3. The method of claim 1, wherein generating the broadcast optimization map comprises:
updating, using the neighbor report, a broadcast coverage map with the first network device;
updating, using the neighbor report, a prospective coverage map with a second network device that is not advertising broadcast services; and
comparing the broadcast coverage map with the prospective coverage map.

4. The method of claim 1, wherein the neighbor report comprises a first flag indicating that the first network device is advertising broadcast services.

5. The method of claim 4, wherein the neighbor report further comprises a second flag indicating whether a broadcast stream was detected.

6. The method of claim 1, further comprising querying a client device for the neighbor report.

7. The method of claim 1, wherein the broadcast optimization map indicates that the set of network devices (i) provides a first coverage of broadcast services within the environment using a first band and (ii) using a second band, provides a second coverage of broadcast services that fills a gap left by the first coverage.

8. A network device comprising:
a memory; and
a hardware processor communicatively coupled to the memory, the hardware processor configured to:
receive a neighbor report that indicates whether a first network device in an environment is advertising broadcast services; and
generate, using the neighbor report, a broadcast optimization map that indicates a set of network devices in the environment that will provide a broadest coverage of broadcast services within the environment, wherein the set corresponds to a minimum count of network devices that supports all current broadcast streams by one or more client devices in the environment.

9. The network device of claim 8, wherein the hardware processor is further configured to disable advertising broadcast services for a second network device that is not included in the set.

10. The network device of claim 8, wherein generating the broadcast optimization map comprises:
updating, using the neighbor report, a broadcast coverage map with the first network device;
updating, using the neighbor report, a prospective coverage map with a second network device that is not advertising broadcast services; and
comparing the broadcast coverage map with the prospective coverage map.

11. The network device of claim 8, wherein the neighbor report comprises a first flag indicating that the first network device is advertising broadcast services.

12. The network device of claim 11, wherein the neighbor report further comprises a second flag indicating whether a broadcast stream was detected.

13. The network device of claim 8, wherein the hardware processor is further configured to query a client device for the neighbor report.

14. The network device of claim 13, wherein the broadcast optimization map indicates that the set of network devices (i) provides a first coverage of broadcast services within the environment using a first band and (ii) using a second band, provides a second coverage of broadcast services that fills a gap left by the first coverage.

15. A computer program product comprising a non-transitory computer-readable storage medium having computer-readable program code embodied therewith, the computer-readable program code executable by one or more computer processors to perform an operation comprising:

receiving a neighbor report that indicates whether a first network device in an environment is advertising broadcast services; and generating, using the neighbor report, a broadcast optimization map that indicates a set of network devices in the environment that will provide a broadest coverage of broadcast services within the environment, wherein the set corresponds to a minimum count of network devices that supports all current broadcast streams by one or more client devices in the environment.

16. The computer program product of claim 15, the operation further comprising disabling advertising broadcast services for a second network device that is not included in the set.

17. The computer program product of claim 15, wherein generating the broadcast optimization map comprises:

updating, using the neighbor report, a broadcast coverage map with the first network device;

updating, using the neighbor report, a prospective coverage map with a second network device that is not advertising broadcast services; and comparing the broadcast coverage map with the prospective coverage map.

18. The computer program product of claim 15, wherein the neighbor report comprises a first flag indicating that the first network device is advertising broadcast services.

19. The computer program product of claim 18, wherein the neighbor report further comprises a second flag indicating whether a broadcast stream was detected.

20. The computer program product of claim 15, the operation further comprising querying a client device for the neighbor report.

\* \* \* \* \*